United States Patent [19]

Weiss et al.

[11] 4,288,352

[45] Sep. 8, 1981

[54] ELECTRICALLY CONDUCTIVE POLYMERIC COMPOSITIONS

[75] Inventors: Robert A. Weiss, Summit; Robert D. Lundberg, Bridgewater, both of N.J.

[73] Assignee: Exxon Research & Engineering Co., Florham Park, N.J.

[21] Appl. No.: 23,632

[22] Filed: Mar. 26, 1979

[51] Int. Cl.³ ............................................. C08L 91/00
[52] U.S. Cl. .......................... 260/23.5 A; 260/30.8 R; 260/31.2 R; 260/32.6 A; 260/33.6 A; 260/33.6 PQ; 260/42.17; 260/DIG. 31
[58] Field of Search .................. 252/511; 260/23.5 A, 260/23 S, 23 H, 42.17, 32.6 A, 30.8 R, DIG. 31

[56] References Cited

U.S. PATENT DOCUMENTS

| | | | |
|---|---|---|---|
| 3,406,126 | 10/1968 | Litant | 252/511 |
| 3,642,728 | 2/1972 | Canter | 260/DIG. 31 |
| 3,870,841 | 3/1975 | Makowski et al. | 260/23.7 R |
| 3,908,061 | 9/1975 | Byrne et al. | 428/368 X |
| 4,014,831 | 3/1977 | Bock et al. | 260/23 S X |
| 4,061,827 | 12/1977 | Gould | 428/368 X |

FOREIGN PATENT DOCUMENTS 48-77395 10/1973 Japan .................................. 252/511
52-59655 5/1977 Japan .

Primary Examiner—Lewis T. Jacobs
Attorney, Agent, or Firm—Richard E. Nanfeldt

[57] ABSTRACT

This invention relates to the injection moldable and extrusion type electrically conductive polymeric blend compositions having a viscosity at 200° C. at 0.73 sec$^{-1}$ of less than about $8 \times 10^5$ poises. The compositions used for elastomeric articles include a neutralized sulfonated polymer; graphite fiber at a concentration of about 1 to about 50 parts by weight per 100 parts by weight of neutralized sulfonated polymer; and a preferential plasticizer at about less than 60 parts by weight based on 100 parts by weight of the neutralized sulfonated polymer. The composition may also optionally include fillers, oils and other additives. These blend compositions can be readily processed due to their superior rheological properties on conventional plastic fabrication equipment, especially on low and high pressure injection molding or extrusion equipment into electrically conductive articles having excellent physical and electrical properties.

17 Claims, No Drawings

ELECTRICALLY CONDUCTIVE POLYMERIC COMPOSITIONS

BACKGROUND OF THE INVENTION

1. Field of the Invention

This invention relates to injection moldable and extrusion type electrically conductive polymeric blend compositions having a viscosity at 200° C. at 0.73 sec$^{-1}$ of less than about $8 \times 10^5$ poises. The compositions used for elastomeric articles include a neutralized sulfonated polymer; graphite fiber at a concentration of about 1 to about 50 parts by weight per 100 parts by weight of neutralized sulfonated polymer; and a preferential plasticizer at less than about 60 parts by weight based on 100 parts by weight of the neutralized sulfonated polymer. The composition may also optionally include fillers, oils and other additives. These blend compositions can be readily processed due to their superior rheological properties on conventional plastic fabrication equipment, especially on low and high pressure injection molding or extrusion equipment into electrically conductive articles having excellent physical and electrical properties.

2. Description of the Prior Art

Although polymers are in general non-conductive and are used in a multitude of insulating applications, there is a considerable commercial interest in conductive rubbers and plastics. For example, conductive compounds have been used for the prevention of corona discharge in cables, for antistatic purposes, and for heating. Antistatic polymers can be used in situations where explosive vapors, liquids or powders are handled, for aircraft tires in order to conduct to the ground the static charges generated by the tires or acquired in flight, or for manufacturing equipment in order to dissipate the static charges generated on production line machinery (for example, rolls and conveyor belts). Other applications for conductive rubbers include materials for heating purposes or deformable circuit components such as a conductive keyboard for a typewriter or a calculator.

Conductive rubbers have an advantage over metals in that they are flexible and are able to absorb mechanical shock. Furthermore, they are easily formed into complex geometrical shapes, have low densities, can be compounded to yield a wide range of electrical conductivities and thermal conductivities, and can be more corrosion resistant than metals. Disadvantages of conventional conductive rubbers versus metals are that they generally have lower mechanical properties, have a more restrictive useful temperature range, and cannot be produced with conductivities as high as metals.

The traditional conductive rubber consists of an elastomer filled with carbon black, graphite powder, or metal powders. In general, in order to achieve a high conductivity in particulate filled elastomers, a relatively high loading (at least 20 weight percent) is required. For example, Gurland (Trans. Met. Soc. AIME, 236, 642 (1966)) has shown that plastic compounds become electrically conductive with the addition of 38 volume percent conductive spheres randomly distributed in the polymer. Malliaris and Turner (J. Appl. Phys., 42, 614 (1971)) were able to make conductive polymers with 6 volume percent metal particles, but were unable to achieve this on a large scale. Norman (*Conductive Rubbers and Plastics*, Elsevier Publ. Co., New York, 1970) gives relationships between electrical resistivity and carbon black loadings for numerous filled rubbers and different carbon blacks. In all cases, loadings greater than 20 phr by weight are needed in order to achieve a low resistivity (i.e., of the order of $10^2$–$10^4$ ohms-cm).

The instant invention relates to electrically conductive polymeric blend compositions which include carbon or graphite fibers blended in a neutralized sulfonated polymer. Graphite fibers have been used to prepare electrically conductive elastomeric (rubber) compositions. For example, Japan Kokai No. 77-59,645 described a composition based on 2–80 phr by weight of graphite fibers in a vulcanized styrene butadiene rubber. While such materials may be of value they require the time consuming and expensive step of vulcanization, and once that step is effected, the resulting products are not reprocessable. In contrast, the polymeric compositions of the instant invention can be readily processed on conventional thermoplastic machinery, i.e., extrusion or injection molding. Further the inventive compositions possess the strength and rigidity normally associated with cured rubbers. The ability to process these materials as thermoplastics means that these materials can be molded economically into a variety of intricate shapes and can be reprocessed readily. The electrically conductive polymeric blend compositions of the instant invention can be formed from carbon or graphite fibers at significantly lower levels of incorporation of carbon or graphite fibers than levels needed for carbon black while maintaining excellent physical properties at these lower levels of graphite fiber loading. The data given in the examples of the instant invention clearly demonstrate that electrically conductive polymeric blend compositions can be prepared using graphite fibers at loadings significantly lower than for carbon black. A range of conductivities (conversely, resistivities) can be achieved by varying the fiber loading and/or the fiber length. These polymeric compositions can be processed on typical polymer processing equipment such as a Brabender or Banbury mixer, a continuous intensive mixer, single and twin screw extruders, and injection molding equipment. The data of the instant invention further demonstrates that the polymeric blend composition can be made from a blend of a plasticized sulfonated polymer with graphite fiber wherein the polymeric blend composition is formed into the conductive fibers, pads, or other complex shapes. These polymeric blend compositions of sulfonated elastomers or sulfonated plastics can be processed by conventional thermoplastic techniques or cast from solution.

SUMMARY OF THE INVENTION

It has been found surprisingly that polymeric blend compositions formed from blends of neutralized sulfonated elastomeric or thermoplastic polymers, in particular a select class of neutralized sulfonated elastomeric or thermoplastic polymers, carbon or graphite fiber having a defined fiber length, and a preferential plasticizer have suitable rheological, physical, and electrical properties for the formation of an electrically conductive polymeric article and are readily reprocessable into complex shaped articles.

GENERAL DESCRIPTION

This present invention relates to unique and novel blend compositions of a neutralized sulfonated elastomer or thermoplastic and carbon or graphite fiber having a defined fiber length and preferential plasticizer wherein the resultant composition has a viscosity at 0.73 sec$^{-1}$ at 200° C. of less than about $8 \times 10^5$ poises. The compositions are readily processable in a conventional injection molding process into a high performance electrically conductive polymeric article such as conductive fibers or conductive pads. The resultant electrically conductive polymeric article has excellent physical properties such as tensile strength and compression set and excellent electrical properties such as volume resistivity. Various critically selected additives can be incorporated into the electrically conductive polymeric blend compositions such as certain specific fillers and certain specific oils or lubricants.

The neutralized sulfonated polymers of this present instant invention are derived from unsaturated thermoplastic or elastomeric polymers which include low unsaturated elastomeric polymers such as Butyl rubber, and EPDM terpolymers as well as other unsaturated elastomeric polymers such as partially hydrogenated polyisoprenes, partially hydrogenated polybutadienes, Neoprene, styrene-butadiene copolymers or isoprene-styrene random copolymers and mixtures thereof. The thermoplastic polymers of the present invention which are sulfonated include generally polyvinyl aromatic and polyolefinic type thermoplastics.

The expression "Butyl rubber" as employed in the specification and claims is intended to include copolymers made from a polymerization reaction mixture having therein from about 70 to 99.5% by weight of an isoolefin which has about 4 to 7 carbon atoms, e.g. isobutylene, and about 0.5 to 30% by weight of a conjugated multiolefin having from about 4 to 14 carbon atoms, e.g. isoprene. The resulting copolymer contains about 85 to 99.8% by weight of combined isoolefin and about 0.2 to 10% of combined multiolefin, more preferably about 1 to about 4%, e.g. 2%. Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The Mooney viscosity (ML, 1+8, 212° F.) of the Butyl rubber is about 5 to 90, more preferably about 10 to 60, and most preferably about 15 to about 50. The preparation of Butyl rubber is described in U.S. Pat. No. 2,356,128 which is incorporated herein by reference. Illustrative of a useful Butyl rubber is Exxon Butyl 365 (Exxon Chemical Co.), having a mole percent unsaturation of about 2.0% and a Mooney viscosity (ML, 1+8, 212° F.) of about 40–50. Lower molecular weight Butyl rubbers can also be used, i.e., Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D 1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene (10 to 53 wt. %). Preferably, the polymer contains about 50 to about 70 wt. % ethylene, e.g. 50 wt. % and about 2.6 to about 8.0 wt. % diene monomer, e.g. 5.0 wt. %. The diene monomer is preferably a nonconjugated diene. Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene and methyl tetrahydroindene. The EPDM terpolymers of this invention have a number average molecular weight (Mn) as measured by GPC of about 10,000 to about 200,000 more preferably of about 15,000 to about 100,000. The Mooney viscosity (ML, 1+8, 212° F.) of the EPDM terpolymer is about 5 to about 90, more preferably about 10 to about 60, most preferably about 15 to about 50. The $\overline{M}v$ as measured by GPC of the EPDM terpolymer is preferably below about 400,000 and more preferably below about 300,000. The $\overline{M}w$ as measured by GPC of the EPDM terpolymer is preferably below about 500,000 and more preferably below about 400,000.

A typical useful EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5 wt. %. The $\overline{M}n$ of Vistalon 2504 as measured by GPC measurement is about 100,000. The $\overline{M}v$ is about 310,000 by GPC measurement and the $\overline{M}w$ is about 360,000 by GPC measurement. Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 90,000 by GPC measurement, the $\overline{M}v$ is about 230,000 by GPC measurement and the $\overline{M}w$ is about 250,000 by GPC measurement. Nordel 1320 (DuPont) is another terpolymer having a Mooney viscosity of 212° F. of about 25 and having about 53 wt. % of ethylene, about 3.5 wt. % of 1,4-hexadiene, and about 43.5 wt. % of propylene.

The polyvinyl aromatic thermoplastic resins are selected from the group consisting of polystyrene, poly-t-butyl-styrene, polychlorostyrene, poly-methylstyrene and co- or terpolymers of the aforementioned with acrylonitrile or vinyl toluene and mixtures thereof. The polyvinylaromatic based thermoplastics suitable for use in the practice of the invention have a glass transition temperature from about 80° C. to about 150° C., more preferably about 90° C. to about 140° C. and most preferably about 90° C. to about 120° C. These polyvinylaromatic resins have a weight average molecular weight ($\overline{M}n$) as measured by GPC of about 5,000 to about 500,000, more preferably about 20,000 to about 350,000 and most preferably about 90,000 to about 300,000 wherein the polyvinylaromatic thermoplastic resins can be prepared directly by any of the known polymerization processes. The number average molecular weight of these polyvinyl aromatic thermoplastic resins is about 5,000 to about 2,000,000, more preferably about 20,000 to about 500,000. The term "thermoplastic" is used in its conventional sense to mean a substantially rigid (flexural modulus > 10,000 psi) material capable of retaining the ability to flow at elevated temperatures for relatively long times. The preferred polyvinyl aromatic thermoplastic resin is a homopolymer of styrene having a number average molecular weight of about 180,000, and an intrinsic viscosity in toluene of about 0.8. These polymers are widely available commercially in large volume. A suitable material is Dow Polystyrene 666 which has a number average molecular weight of 230,000.

The polyolefinic thermoplastic resins of the present invention include those which are based on the polymerization of such monomers as ethylene, propylene, 4-methyl-1-pentene and 1-butene. In order for these systems to be successfully employed in the present invention, copolymers of such monomers with a suitable diene (e.g., 5-ethylidene-2-norbornene (ENB)) or an aromatic based olefin (e.g. styrene) must be employed. For example, crystalline copolymers of ethylene with ENB can be prepared in a manner identical to that employed to prepare ethylene-propylene terpolymers (EPDM), but with little or no propylene present. When such copolymers are prepared with diene contents less than 10%, they can be highly crystalline and behave as thermoplastics. Despite the fact that these systems will always require some diene present, we shall refer to these materials as polyolefins. The same types of crystalline systems can be prepared with propylene/diene, butene-1/diene, etc. In all cases these polymers are rigid plastic systems which can be sulfonated by the techniques described below.

In carrying out the sulfonation process of the instant invention the polymer is dissolved in a non-reactive solvent or formed in situ in the non-reactive solvent such as a chlorinated aliphatic hydrocarbon, chlorinated aromatic hydrocarbon, an aromatic hydrocarbon, or an aliphatic chlorinated hydrocarbon such as carbon tetrachloride, dichloroethane, chlorobenzene, benzene, toluene, xylene, cyclohexane, pentane, isopentane, hexane, isohexane or heptane. The preferred solvents for elastomeric polymers are the lower boiling aliphatic hydrocarbons and the preferred solvent for the thermoplastic polymers is dichloroethane. A sulfonating agent is added to the solution (cement) of the polymer and non-reactive solvent at a temperature of about $-100°$ C. to about $100°$ C. for a period of time sufficient to effect sulfonation, for example about 1 to about 60 minutes, most preferably at room temperature for about 5 to 45 minutes; and most preferably about 10 to about 30. Typical sulfonating agents are described in U.S. Pat. Nos. 3,642,728 and 3,836,511, which are incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol or triethylphosphate. The most preferred sulfonation agent for the sulfonation process is an acyl sulfate selected from the group consisting of benzoyl, acetyl, propionyl or butyryl sulfate. The acyl sulfate can be formed in situ in the reaction medium or pregenerated before its addition to the reaction medium in a chlorinated aliphatic or aromatic hydrocarbon. It should be pointed out that neither the sulfonating agent nor the manner of sulfonation is critical, provided that the sulfonating method does not degrade the polymeric backbone.

The sulfonation reaction is quenched by the addition of an aliphatic alcohol to the cement. Suitable examples of quenching agents are methanol, ethanol, isopropanol, an aromatic hydroxyl compound, such as phenol, a cycloaliphatic alcohol such as cyclohexanol or water. The sulfonated polymer of the sulfonated elastomeric polymer has about 5 to about 100 meq. sulfonate groups per 100 grams of sulfonated polymer, more preferably about 10 to about 50, and most preferably about 15 to about 40. The meq. of sulfonate groups/100 grams of polymer is determined by both titration of the sulfonated polymer and Dietert Sulfur analysis. In the titration of the sulfonated polymer, the polymer is dissolved in solvent consisting of 95 parts of toluene and 5 parts of methanol at a concentration level of 50 grams per liter of solvent. The sulfonated polymer is titrated with ethanolic sodium hydroxide to an Alizarin Thymolphthalein endpoint.

The sulfonated polymer substantially is gel-free and hydrolytically stable. Gel is measured by stirring a given weight of sulfonated polymer in a solvent comprised of 95 toluene-5-methanol at a concentration of 5 wt. % polymer for 24 hours, allowing the mixture to settle, withdrawing a weighed sample of the supernatant solution and evaporating to dryness. Hydrolytically stable means that the sulfonated polymer will not be eliminated under neutral or slightly basic conditions to a neutral moiety which is incapable of being converted to highly ionic functionality.

Neutralization of the sulfonated polymer is done by the addition of a solution of a basic material to the unneutralized sulfonated polymer dissolved in the mixture of the aliphatic alcohol and non-reactive solvent. The basic material such as a basic salt is dissolved in a binary solvent system consisting of water and/or an aliphatic alcohol. The counter-ion of the basic salt is selected from the group consisting of antimony, ammonium, aluminum, lead and metal ions from Group IA, IIA, IB and IIB of the Periodic Table of Elements and mixtures thereof. The anion of the basic salt is selected from the group consisting of a carboxylic acid having from about 1 to about 22 carbon atoms, more preferably about 2 to about 4 carbon atoms, a hydroxide and alkoxide having about 1 to 4 carbon atoms and mixtures thereof. The preferred neutralizing agent is a metal acetate, more preferably zinc acetate. Sufficient basic salt of the carboxylic acid is added to the solution of the sulfonated polymer to effect neutralization. It is preferable to neutralize at least 95% of the sulfonated polymer, more preferably about 98%, most preferably 100%. Other basic materials useful for neutralization are metal oxides such as MgO, CaO, BaO, ZnO, $Ag_2$), $PbO_2$ and $Pb_3O_4$. Metal hydroxides are also useful as neutralizing agents such as NaOH, KOH, LiOh, $Mg(OH)_2$ and $Ba(OH)_2$. Alternatively, but less preferred, organic amines as described in U.S. Pat. No. 3,642,728, which is herein incorporated by reference, can be used to neutralize the sulfonated polymer. The resultant neutralized sulfonated polymer has a melt viscosity at 0.73 $sec^{-1}$ at $200°$ C., of about $1 \times 10^4$ to about $8 \times 10^5$ poises, more preferably about $2 \times 10^4$ to about $5 \times 10^5$ poises and most preferably about $3 \times 10^4$ to about $3 \times 10^5$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight (which includes the degree of ionic association). The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min and a capillary die of about 0.05 in diameter. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fracture is exhibited by many polymeric materials having high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal or ammonium neutralized sulfonate containing polymers at the higher sulfonate levels possess extremely high melt viscosities and are thereby difficult to process. The addition of ionic group plasticizers markedly reduces melt viscosity and frequently enhances physical properties. To the neutralized sulfonated polymer is added, in either solution or the crumb of the neutralized sulfonated polymer, a preferential plasticizer selected from the group consisting of aliphatic carboxylic acid having about 5 to about 30 carbon atoms, more preferably about 8 to about 22 carbon atoms, and basic salts of these aliphatic carboxylic acids, wherein the metal ion of the basic salt is selected from the group consisting essentially of aluminum, iron, antimony, lead and metal ions from Groups IA, IIA, IB and IIB of the Periodic Table of Elements and mixtures thereof. The preferred carboxylic acid salts are formed from lauric, myristic, palmitic and stearic acids and mixtures thereof; e.g. zinc stearate, magnesium stearate, or zinc laurate. The preferred preferential plasticizers are the metallic salts of the aliphatic carboxylic acids.

The preferential plasticizer is incorporated into the neutralized sulfonated polymer at about 3 to about 60 parts by weight based on 100 parts by weight of the neutralized sulfonated polymer, more preferably at about 9 to about 40, and most preferably at about 10 to about 25. The metallic salt of the aliphatic carboxylic acid can also be used as neutralizing agent. In the case of the neutralizing agent and plasticizer being the identical chemical species, additional metallic salt is added over the required levels of neutralization. Alternatively, other preferential plasticizers are selected from ureas, thioureas and amides such as stearamide, and mixtures thereof. The preferred plasticizers are selected from the metallic salts of the aliphatic carboxylic acids. Materials such as alcohols, esters, ethers or ketones are not suitable plasticizers for the instant invention. The resultant neutralized sulfonated polymer with preferential plasticizer is isolated from the solution by conventional steam stripping and filtration.

The neutralized sulfonated polymer is blended with the graphite fiber having a fiber length of less than 1 inch by techniques well known in the art. For example, the blend composition can be compounded on a two-roll mill. Other methods known in the art which are suitable for making these compositions include those methods employed in the plastic and elastomer industries for mixing polymer systems. An excellent polymeric blend composition of this invention can be obtained through the use of a high shear batch intensive mixer called the Banbury. Alternatively, economic advantages in terms of time and labor savings can be obtained through the use of a Farrel Continuous Mixer (FCM), a twin screw extruder, or tandem extrusion techniques which are continuous mixing types of equipment. The Banbury mixing device is the preferred batch type mixer, and the twin screw extruder or FCM is the preferred continuous mixer.

The graphite fibers of the instant invention can be generally defined as carbon or graphitized carbon filaments derived, for example, from spun fibers of poly(acrylonitrile), rayon or petroleum pitch. The fibers used in the examples of the instant invention have a diameter of about 8 $\mu$m to about 15 $\mu$m and lengths of about 0.125 to about 1.0 inches, a tensile modulus of about $1 \times 10^7$ to about $5 \times 10^7$ psi and a tensile strength of about 100,000 to about 500,000 psi.

The graphite fibers are incorporated into the blend composition at a concentration level of about 1 to about 50 parts by weight per 100 parts by weight of the neutralized sulfonated polymer, more preferably at about 5 to about 35, and most preferably at about 10 to about 20.

Oils and fillers can be optionally added to the polymeric blend composition to modify the physical properties of these compositions. The oils which can be optionally employed in the present invention are non-polar process oils having less than about 2 wt. % polar type compounds as measured by molecular type clay gel analysis. These oils are selected from paraffinics ASTM Type 104B oils, as defined in ASTM D-2226-70, aromatics ASTM Type 102 oils or naphthenics ASTM Type 104A oils, wherein the oil has a flash point by the Cleveland open cup of at least 350° F., a pour point of less than 40° F., a viscosity of about 70 to about 3000 ssu's at 100° F. and a number average molecular weight as measured by GPC of about 300 to about 1000, and more preferably about 300 to 750. The preferred process oils are paraffinic oils. Table I illustrates typical oils encompassed by the scope of this invention. The oils are incorporated into the blend composition at a concentration level of about 5 to about 150 parts by weight based on 100 parts by weight of the neutralized sulfonated polymer, more preferably at about 25 to about 100, and most preferably at about 40 to about 100.

TABLE I

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Paraffinic | Tufflo 6056 | 495 | — | 0.0 | 0.9 | 99.1 |
| Naphthenic | Tufflo 6054 | 580 | — | 0.0 | 8.0 | 92.0 |

The fillers optionally employed in the present invention are selected from the group consisting of carbon blacks, talcs, ground calcium carbonate, water precipitated calcium carbonate, delaminated, calcined and hydrated clays and amorphous silica and mixtures thereof. Examples of carbon black are the furnace, channel or thermal blacks. These fillers are incorporated into the blend composition at about 1 to about 300 parts by weight based on 100 parts by weight of the neutralized sulfonated polymer, more preferably at about 5 to about 250; and most preferably at about 10 to about 200 parts.

Various other additives can be optionally incorporated into the polymeric blend compositions to improve the physical properties, the appearance, the chemical properties of the formed elastomeric article or to modify the processability of the blend compositions. Zinc oxide can be incorporated into the blend as a means for improving the ionic bonding force between the sulfonate groups in the sulfonated polymer. The zinc oxide is incorporated into the blend composition at a concentration level of less than about 25 parts by weight based on 100 parts by weight of the neutralized sulfonated polymer, more preferably at less than about 15.

A metallic hydroxide can be incorporated into the blend composition as a means of further neutralizing any unneutralized sulfonate groups in the compositions. The metallic hydroxide is incorporated at a concentration level of about less than 50 parts by weight per hundred based on 100 parts by weight of the neutralized sulfonated polymer, wherein the metal ion of the metallic hydroxide is selected from Group IIA of the Periodic Table of Elements such as barium, calcium and magnesium.

A lubricant can be employed in the blend composition at a concentration level of about 1 to about 20 parts by weight based on 100 parts by weight of the neutralized sulfonated polymers, and more preferably about 1 to about 15. The lubricants of the present instant invention are non-polar paraffinic hydrocarbon waxes having a softening point of about 135° F. to about 220° F., more preferably 150° F. to 200° F., wherein the wax has a number average molecular weight as measured by GPC of about 1000 to about 4000, more preferably 1500 to 3500, and less than about 2 wt. % polar constituents. These lubricants modify the rheological properties of the composition, improve the processability in forming the polymeric article and impart a shine or gloss to the polymeric article. Additionally, amorphous polypropylene can be used as a lubricant.

DETAILED DESCRIPTION

The advantages of both the electrical and physical properties of the polymeric blend compositions of the present invention can be more readily appreciated by reference to the following examples.

EXAMPLE

Graphite fiber/zinc neutralized, sulfonated polymer compositions were prepared by blending the fibers in a solution of the polymer in a mixed solvent of 90% hexane and 5% isopropanol followed by evaporation of the solvent and drying of the compound. The compositions prepared are described in Table I. The graphite fibers were a commercial product based on a poly(acrylonitrile) precursor and were nominally 8 um in diameter and ⅛ inch in length. The polymer was a zinc neutralized, sulfonated EPDM rubber containing 56 percent ethylene and 30 mmoles sulfonate per 100 grams polymer.

Rectangular samples of various lengths were prepared by compression molding the compositions. The electrical resistances across the length of the samples were measured with a volt-ohm meter and the resistivity was determined by multiplying thhe resistance by the cross-sectional area and dividing by the length of the specimen. These data are given in Table III. The low resistivities clearly demonstrate that these materials are conductive. The mechanical properties of the compounds are given in Table IV and demonstrate the reinforcing effect the fibers have on the polymer.

TABLE II

| Sample | Parts by Weight | | |
|---|---|---|---|
| | Polymer | Graphite Fibers | Zinc Stearate |
| 5342-117 A | 100 | 11 | 10 |
| 5342-117 B | 100 | 25 | 10 |
| 5342-117 C | 100 | 43 | 10 |

TABLE III

| Sample | Fiber Concentration, wt. % | Sample Length in. | Gross Sectional Area, in² | Resistance ohms | Resistivity ohms-in |
|---|---|---|---|---|---|
| 5342-117 A | 10 | 1 | 0.24 | 2 | 0.5 |
| 5342-117 A | 10 | 2 | 0.24 | 3.5 | 0.4 |
| 5342-117 A | 10 | 3 | 0.24 | 4 | 0.3 |
| 5342-117 A | 10 | 4 | 0.24 | 5 | 0.3 |
| 5342-117 A | 10 | 5 | 0.24 | 6 | 0.3 |
| 5342-117 A | 10 | 6 | 0.24 | 10 | 0.4 |
| 5342-117 B | 25 | 1 | 0.34 | 0.5 | 0.1 |
| 5342-117 B | 25 | 2 | 0.34 | 0.8 | 0.1 |
| 5342-117 B | 25 | 3 | 0.34 | 1.0 | 0.1 |
| 5342-117 B | 25 | 4 | 0.34 | 1.2 | 0.1 |
| 5342-117 B | 25 | 5 | 0.34 | 1.4 | 0.1 |
| 5342-117 B | 25 | 6 | 0.34 | 2 | 0.1 |
| 5342-117 C | 40 | 1 | 0.34 | 0.4 | 0.1 |
| 5342-117 C | 40 | 2 | 0.34 | 0.5 | 0.09 |
| 5342-117 C | 40 | 3 | 0.34 | 0.5 | 0.06 |
| 5342-117 C | 40 | 4 | 0.34 | 0.8 | 0.07 |
| 5342-117 C | 40 | 5 | 0.34 | 0.9 | 0.06 |
| 5342-117 C | 40 | 6 | 0.34 | 1.2 | 0.07 |

TABLE IV

| Sample | Fiber Concentration (wt. %) | Tensile Modulus (psi) | Tensile Strength (psi) |
|---|---|---|---|
| 5342-117 A | 10 | $1.6 \times 10^5$ | 2200 |
| 5342-117 B | 25 | $2.2 \times 10^5$ | 2900 |
| 5342-117 C | 40 | $4.7 \times 10^5$ | 4500 |

What is claimed is:

1. A polymeric composition produced by the high shear intensity mixing of a mixture of:
   (a) a neutralized sulfonated polymer having about 5 to about 100 meq. neutralized sulfonate groups per 100 grams of said neutralized sulfonate polymer, said neutralized sulfonated polymer being formed from a unsulfonated polymer having a Mooney viscosity (M.L. 1+8, 212° F.) of about 10 to about 60;
   (b) about 10 to 20 parts by weight of discontinuous and uniaxially oriented carbon or graphite fibers per 100 parts by weight of said neutralized sulfonated polymer, said fibers having a length of about 0.125 inches; and
   (c) at least about 3 parts by weight of a preferential ionic plasticizer based on 100 parts by weight of said neutralized polymer.

2. A composition according to claim 1, wherein said neutralized sulfonated polymer is formed from an elastomeric polymer selected from the group consisting of a copolymer of an isoolefin and a conjugated multiolefin, and an EPDM terpolymer.

3. A composition according to claim 1, wherein said neutralized sulfonated polymer is formed from a polyvinyl aromatic thermoplastic selected from the group consisting of polystyrene, poly-t-butyl styrene, polychlorostyrene, poly-methylstyrene, and terpolymers of the aforementioned with acrylonitrile or vinyl toluene and mixtures thereof.

4. A composition according to claim 1, wherein said neutralized sulfonate groups are neutralized with a counterion being selected from the group consisting of ammonium, antimony, aluminum, lead and metal ions from Groups IA, IIA, IB and IIB of the Periodic Table of Elements and mixtures thereof.

5. A composition according to claim 2, wherein said EPDM terpolymer consists of about 40 to about 80wt. % of ethylene, of about 10 to about 53 wt. % of propylene and of about 1 to about 10 wt. % of a non-conjugated diene.

6. A composition according to claim 5, wherein said non-conjugated diene is selected from the group consisting of 1,4-hexadiene, alkenyl substituted norbornenes, and tetrahydroindene.

7. A composition according to claim 6, wherein said non-conjugated diene is 5-ethylidene-2-norbornene.

8. A composition according to claim 1, wherein said preferential plasticizer is present at a concentration level of at least about 9 parts by weight based on 100 parts by weight of said neutralized sulfonated polymer.

9. A composition according to claim 8, wherein said preferential plasticizer is selected from the group consisting of carboxylic acids and metallic salts of said carboxylic acids and mixtures thereof, said carboxylic acid having about 5 to about 30 carbon atoms.

10. A composition according to claim 8, wherein said preferential plasticizer is a combination of stearic acid and a metallic salt of said stearic acid, the metal ion of said metallic salt being selected from the group consisting of lead, antimony, aluminum and metals from Groups IA, IIA, IB and IIB of the Periodic Table of Elements and mixtures thereof.

11. A composition according to claim 1, wherein said preferential plasticizer is a metallic salt of an aliphatic carboxylic acid having about 5 to about 30 carbon atoms.

12. A composition according to claim 1, wherein said preferential plasticizer is selected from the group consisting of an amide, an urea, a thiourea, and a metallic salt of an aliphatic carboxylic acid having about 5 to about 30 carbon atoms.

13. A composition according to claim 1, further including a non-polar process oil being selected from the group consisting of paraffinic oils, naphthenic oils, and aromatic oils and mixtures thereof.

14. A composition of claim 1, further including a crystalline hydrocarbon was having a melting point of about 135° F. to about 220° F. and an $\overline{M}n$ of about 1000 to about 4000.

15. A composition according to claim 14, further including a filler selected from the group consisting of carbon black, calcium carbonate, amorphous silica, talc and clay and mixtures thereof.

16. The composition according to claim 1, further including a filler selected from the group consisting of carbon black, calcium carbonate, amorphous silica, talc and clay and mixtures thereof.

17. The composition according to claim 1, wherein said preferential plasticizer is zinc stearate.

* * * * *